United States Patent [19]
Iguchi et al.

[11] Patent Number: 5,977,006
[45] Date of Patent: Nov. 2, 1999

[54] BARIUM TITANATE-MAGNESIUM CERAMIC FOR USE IN CAPACITORS OR THE LIKE

[75] Inventors: Yoshiaki Iguchi, Haruna-machi; Mutsumi Honda, Maebashi; Hiroshi Kishi, Fujioka, all of Japan

[73] Assignee: Taiyo Yuden Co., Ltd., Tokyo, Japan

[21] Appl. No.: 09/072,789

[22] Filed: May 6, 1998

[30] Foreign Application Priority Data

May 6, 1997 [JP] Japan ................................ 9-132851

[51] Int. Cl.$^6$ ................................................ C04B 35/468
[52] U.S. Cl. ................................ 501/137; 501/139
[58] Field of Search ........................... 501/137, 139

[56] References Cited

U.S. PATENT DOCUMENTS

| | | | |
|---|---|---|---|
| 5,427,988 | 6/1995 | Sengupta et al. ........... | 501/137 |
| 5,646,080 | 7/1997 | Chu et al. .................. | 501/137 |
| 5,801,112 | 9/1998 | Okawa et al. .............. | 501/137 |
| 5,841,626 | 11/1998 | Sano et al. ................. | 501/137 |
| 5,858,901 | 1/1999 | Chu et al. .................. | 501/139 |

*Primary Examiner*—Karl Group
*Attorney, Agent, or Firm*—Woodcock Washburn Kurtz Mackiewicz & Norris LLP

[57] ABSTRACT

A dielectric ceramic essentially in the form of an aggregate of crystal grains each having a ferroelectric core enclosed in a paraelectric shell. The shells are created by thermal diffusion of magnesium into the crystal grains. Through control of the firing temperature and time the thicknesses of the shells are confined in the range of approximately 5–30% of the average grain size. The resulting ceramic is low in dielectric constant and favorable in temperature characteristic of capacitance, making it suitable for use in laminated capacitors.

3 Claims, 3 Drawing Sheets

BARIUM TITANATE-MAGNESIUM CERAMIC FOR USE IN CAPACITORS OR THE LIKE

BACKGROUND OF THE INVENTION

This invention relates to dielectric ceramics, and more specifically to ferroelectric ceramics composed principally of barium titanate ($BaTiO_3$) for use in capacitors, among other applications.

$BaTiO_3$ is a well known major component of ferroelectric ceramics. The ceramics have also been known wherein each crystal grain is constituted of a ferroelectric core and a paraelectric shell, with the former nested in the latter, with a view to a higher dielectric constant and a more favorable temperature characteristic (change in capacitance with temperature). Magnesium (Mg) is employed, usually in combination with other additives, to create the paraelectric shells by dispersion in the ferroelectric crystal grains.

An objection to the prior art $BaTiO_3$—Mg ceramics of the core-shell crystal grain configuration concerns the depth of the Mg shells. As far as the applicant is aware, no particular measure has been taken in the ceramics industry to preclude the dispersion of Mg particles too deep into the $BaTiO_3$ crystal grains. The shells of the resulting ceramics have therefore been not so thin as could be desired, failing to provide ceramics that were sufficiently high in dielectric constant and favorable in temperature characteristic.

A current trend in laminated ceramic capacitors is toward larger capacitances, with, however, the dielectric layers made thinner. Moreover, very high standards of quality are required for such capacitors. As so far manufactured, the $BaTiO_3$—Mg ceramics have become totally incapable of providing capacitors meeting such standards.

SUMMARY OF THE INVENTION

The present invention seeks to improve $BaTiO_3$—Mg dielectric ceramics for a higher dielectric constant and a more constant temperature characteristic.

Briefly, this invention is directed to a dielectric ceramic consisting essentially of a major ingredient expressed by the general formula, $ABO_3$ and one or more additives including Mg. In the general formula expressing the major ingredient, A is either barium (Ba), Ba and calcium (Ca), or Ba and Ca and strontium (Sr); B is either titanium (Ti), Ti and zirconium (Zr), Ti and R, or Ti and Zr and R, where R is one or more of scandium (Sc), yttrium (Y), gadolinium (Gd), dysprosium (Dy), holmium (Ho), erbium (Er), ytterbium (Yb), terbium (Tb), thulium (Tm), and lutetium (Lu); and is oxygen. The ceramic of this general composition is essentially an aggregate of a multiplicity of crystal grains each having a paraelectric shell enclosing a ferroelectric core. The invention specifically concerns the depth of the grain shells, which typically are formed by thermal diffusion of Mg into the grains. The shell depth of each crystal grain should be from about five to about 30 percent of the average grain size.

Experiment has proved that, diffused into the ceramic crystal grains to depths of less than about five percent of the average grain size, Mg creates paraelectric shells of so insufficient thickness around the grains that the resulting ceramics are low in dielectric constant at room temperature and uneven in temperature characteristic. A diffusion of Mg to depths of over approximately 30 percent, on the other hand, has proved to make the ferroelectric cores too small in size. The resulting ceramics are unsatisfactory in temperature characteristic at high temperatures. Further, as the amount Mg left undiffused among the crystal grains become too small, the grains become easy to grow inordinately, ultimately resulting in the disappearance of a well delineated boundary between the grains.

Only when Mg is diffused to depths ranging from about five to about 30 percent of the average grain size are the ceramics obtained that are well sintered, that have a well defined core-shell configuration, and that are high in dielectric constant and favorable in temperature characteristic. The ceramics thus fabricated according to the invention find optimum use in large capacitance, laminated capacitors, making them far better in quality than heretofore.

The above and other objects, features and advantages of this invention will become more apparent, and the invention itself will best be understood, from the following detailed description taken together with the attached drawings.

DETAILED DESCRIPTION

The major component of the dielectric ceramics according to this invention, broadly defined in the foregoing summary of the invention, can take the form of any of the following substances in the practice of the invention:

$BaTiO_3$,

Ba (Ti, Zr) $O_3$, (Ba, Ca) $TiO_3$, (Ba, Ca) (Ti, Zr) $O_3$, (Ba, Ca, Sr) $TiO_3$, (Ba, Ca, Sr) (Ti, Zr) $O_3$,

Ba (Ti, R) $O_3$,

Ba (Ti, Zr, R) $O_3$, (Ba, Ca) (Ti, R) $O_3$, (Ba, Ca) (Ti, Zr, R) $O_3$, (Ba, Ca, Sr) (Ti, R) $O_3$, and (Ba, Ca, Sr) (Ri, Zr, R) $O_3$ where R is one or more rare earth elements chosen from among Sc, Y, Gd, Dy, Ho, Er, Yb, Tb, Tm, and Lu.

Mg is currently considered an indispensable additive. This additive may be additionally combined with one or more of lithium oxide or lithia ($Li_2O$), silicon dioxide or silica ($SiO_2$), boric oxide ($B_2O_3$), chromic oxide ($Cr_2O_3$), and aluminum oxide or alumina ($Al_2O_3$). Preferred combinations of additives are:

$Li_2O$, $SiO_2$, and MgO;

$B_2O_3$, $SiO_2$, and MgO;

$B_2O_3$, $SiO_2$, $Li_2O$, and MgO;

$Cr_2O_3$ and MgO;

$Al_2O_3$ and MgO;

$Cr_2O_3$, $Al_2O_3$, and MgO;

$Li_2O$, $SiO_2$, MgO, and $Cr_2O_3$ and/or $Al_2O_3$;

$B_2O_3$, $SiO_2$, MgO, and $Cr_2O_3$ and/or $Al_2O_3$;

$B_2O_3$, $SiO_2$, $Li_2O$, MgO, and $Cr_2O_3$ and/or $Al_2O_3$.

Further, as required or desired, the oxides of barium (Ba), strontium (Sr), calcium (Ca), and zinc (Zn) may be added, either singly or in combination of two or more, to any of the foregoing preferred combinations of additives.

Laminated capacitors were manufactured by use of a dielectric ceramic fabricated according to the present invention. The following major ingredient and additives were prepared in the following proportions for fabrication of the ceramic:

$BaTiO_3$ . . . 100 mole parts

MgO . . . 0.6 mold part $Ho_2O_3$ . . . 0.8 mole part

MnO . . . 0.4 mole part $SiO_2$ . . . 1.5 mole parts.

The mixture of the above ingredients was ball milled with pure water for 15 hours. After being dried, the mixture was then slurried, and the slurry was molded into sheet form by a reverse coater. Then an electroconductive paste was coated on the sheets. Then 150 such coated sheets were stacked up, and the stack was cut in latticed pattern into a multiplicity of chips. Then these chips were fired at 1200° C. in a reductive atmosphere for three hours, thereby completing laminated capacitors, which will be hereinafter referred to as the Sample I capacitors.

Figure 1:
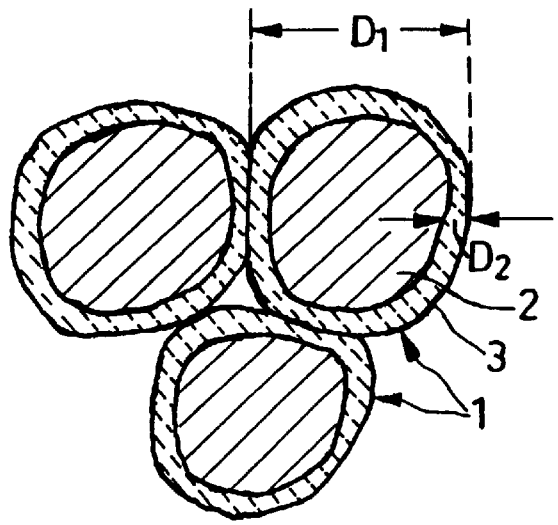
FIG. 1 is a greatly magnified, highly schematic cross sectional representation of some crystal grains of a dielectric ceramic formulated according to this invention, the figure being explanatory in particular of the core-shell configuration of each grain.

The ceramic manufactured as above is an aggregate of a multiplicity of crystal grains designated 1 in FIG. 1. Although this figure is highly schematic and somewhat idealized, it will nevertheless be seen that each crystal grain 1 is constituted of a ferroelectric core 2 and a paraelectric shell 3 . The shells 3 are considered created by diffusion of Mg into the crystal grains to limited depths.

Figure 2:
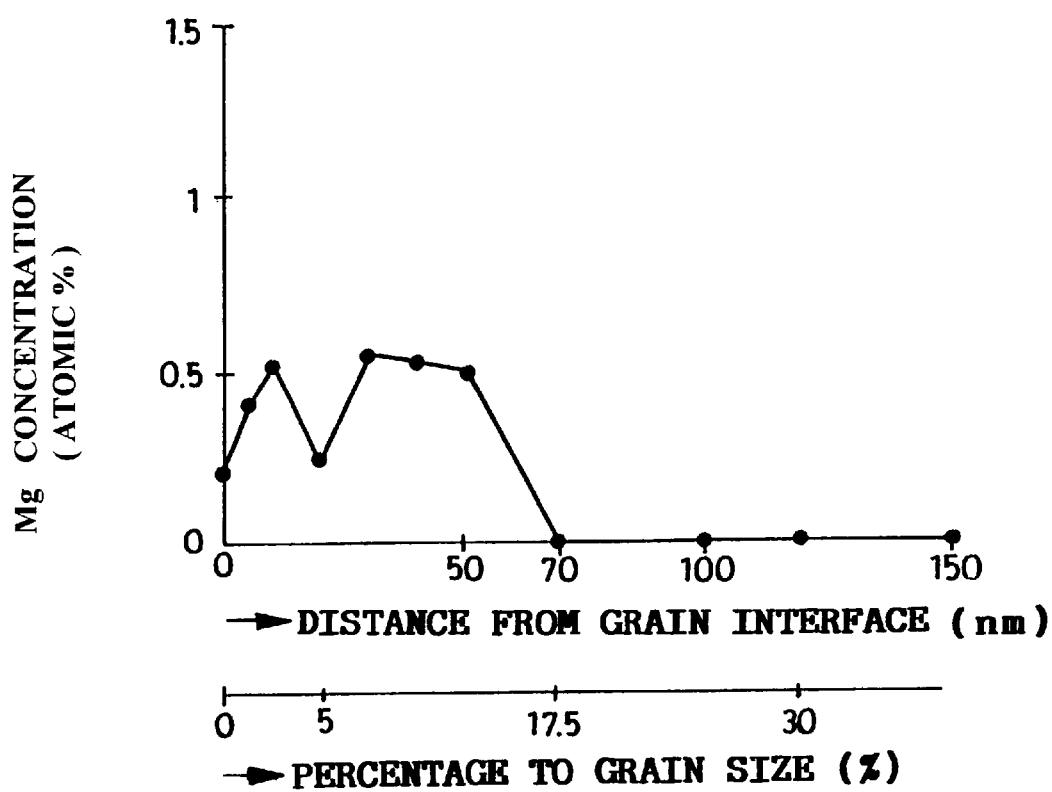
FIG. 2 is a graph plotting the curve of Mg concentration in a ceramic crystal grain according to the invention against the distance from the grain-to-grain interface.

FIG. 2 graphically represents a typical distribution of Mg concentration in the shells 3 of the crystal grains 1 of the Sample I capacitors as studied by an analytical electron microscope. It will be noted that Mg was distributed, in the sample grain studied, to a depth $D_2$ of 70 nanometers from the grain interface, forming a shell 3 of that thickness. The average size $D_1$ of the crystal grains 1 of the Sample 1 capacitors was about 400 nanometers. Thus the percentage of the shell depth $D_2$ to the average grain size $D_1$ was 17.5 percent. The fact that the percentage of the shell depth $D_2$ of the sample grain to the average grain size $D_1$ is 17.5 percent means that, practically, the percentages of the shell depths $D_2$ to the sizes $D_1$ of all the crystal grains are also approximately 17.5 percent on the average. Generally, the percentages of the shell depths $D_2$ to the average grain size $D_1$ should be from about five to about 30 percent for providing ceramics suitable for use in high quality, laminated ferroelectric capacitors.

The specific dielectric constants of the Sample 1 capacitors averaged 2360 at 25° C. The temperature characteristics $\Delta C+125$ and $\Delta C-55$ of capacitances of the Sample 1 capacitors at 125° C. and −55° C. were measured according to the equations:

$\Delta C+125=[(C+125-C+25)/C+25]\times 100(\%)$ $\Delta C-55=[(C-55 -C+25)/C+25]\times 100(\%)$ where C+25, C+125, and C−55 are capacitances at 25°, 125°, and −55° C., respectively. C+125 was −2.1 percent, and C−55 was −7.1 percent.

Figure 5:
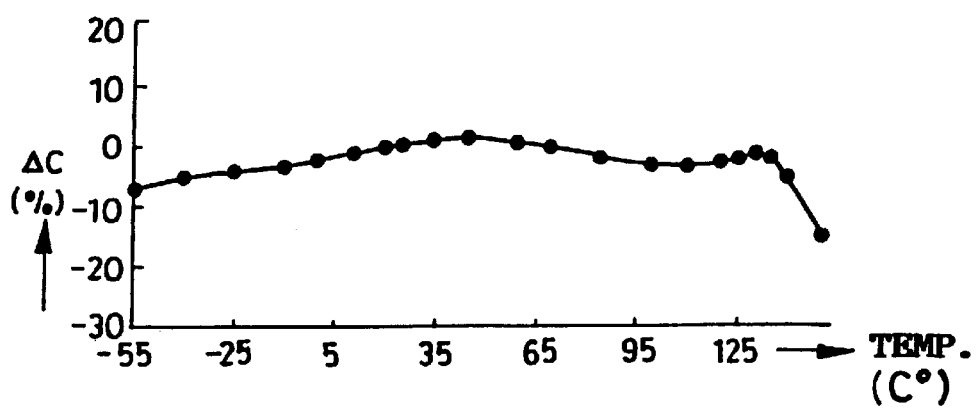
FIG. 5 is a graph showing the temperature characteristic of the capacitance of the FIG. 2 ceramic.

The temperature characteristics of capacitances of the Sample 1 capacitors were measured at temperatures other than −55° and +125° C. The results were as plotted in FIG. 5, from which it is clear that the Sample 1 ceramic is extremely flat in temperature characteristic, making possible the provision of very high quality laminated capacitors.

Additional sample capacitors were manufactured by the same method as Sample I except that the firing time was set at 1.0, 1.5, 5.0, and 8.0 hours in order to vary the depth $D_2$ to which Mg is diffused into the crystal grains to form the paraelectric shells 3. Then the shell depths $D_2$, specific dielectric constants $\epsilon\Gamma$, and temperature characteristics of capacitances of these additional samples at +125° and −55° C. were measured. The results were as tabulated below:

| Sample | Shell Depth $D_2$ (nm) | Specific Dielectric Constant $\epsilon\Gamma$ | Temperature Characteristic at +125° C. (%) | Temperature Characteristic at −55° C. (%) |
|---|---|---|---|---|
| 2 | 10 | 1670 | +13.8 | −12.2 |
| 3 | 20 | 2000 | +9.5 | −9.0 |
| 4 | 120 | 2400 | +10.0 | −9.5 |
| 5 | 150 | 1890 | +22.3 | −23.4 |

Samples 2 through 5 were all 400 nanometers in average grain size $D_1$. The percentages of the shell depths $D_2$ of these Samples with respect to the average grain size $D_1$ were therefore 2.5 percent, 5.0 percent, 30.0 percent, and 37.5 percent, respectively.

For use as high quality laminated capacitors, the specific dielectric constant should be not less than 2000, and the temperature characteristics of capacitances at +125° and −55° C. should be not more than +10 percent and not less than −10 percent, respectively. Samples 3 and 4 meet these criteria and are therefore in accordance with the present invention. Samples 2 and 5 do not come up to the criteria and so fall outside the purview of the invention.

From the above studied characteristics of Samples 1–5, as well as those of other samples tested to complete this invention, it is concluded that the required range of percentages of the shell depth $D_2$ to the average grain size $D_1$ is from about five to about 30 percent, preferably from 10 to 25 percent, and most desirably from 15 to 20 percent.

Figure 3:
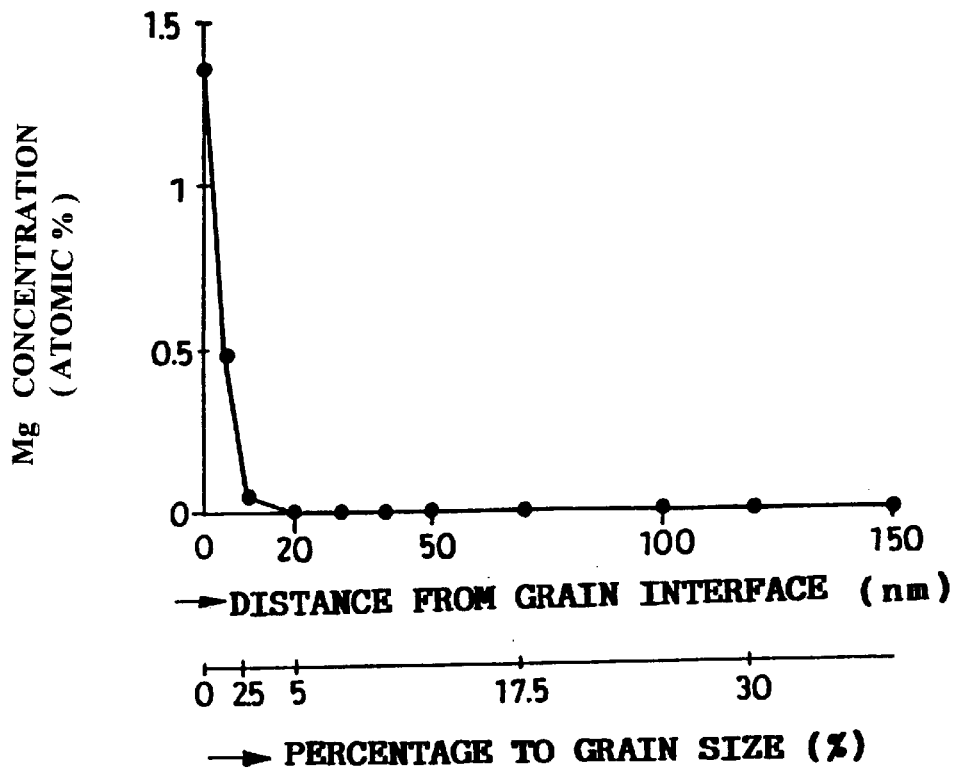
FIG. 3 is a graph plotting the curve of Mg concentration in a prior art ceramic crystal grain against the distance from the grain-to-grain interface.
Figure 4:
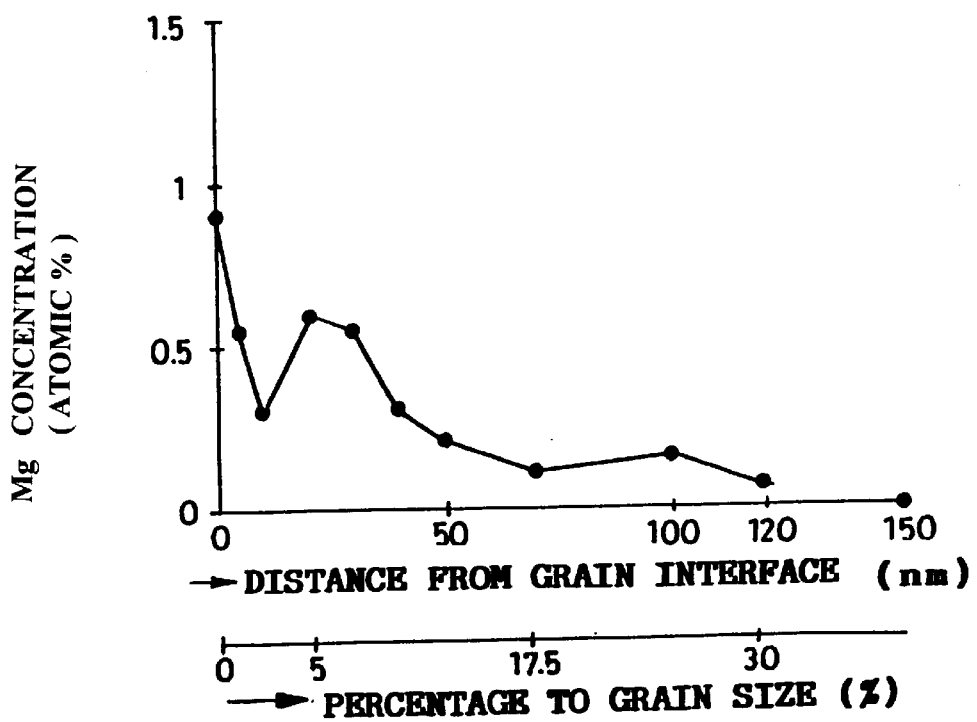
FIG. 4 is a graph plotting the curve of Mg concentration in another prior art ceramic crystal grain against the distance from the grain-to-grain interface.

Just how incomplete is the core-shell configuration of Samples 2 and 5 ceramic crystal grains will become apparent from an inspection of FIGS. 3 and 4. These graphs plot the curves of typical Mg concentrations against the distance from the grain surface in Samples 2 and 5 ceramic crystal grains, respectively. As will be observed from FIG. 3, when the Mg shells are as shallow as 10 nanometers as in Sample 2, the Mg concentration is very high at the grain surfaces but rapidly drops to zero. FIG. 4 indicates, on the other hand, that the Mg concentration becomes too low with an increase in depth, and the ferroelectric cores become too small. There is, moreover, no well defined boundary between cores and shells.

Figure 6:
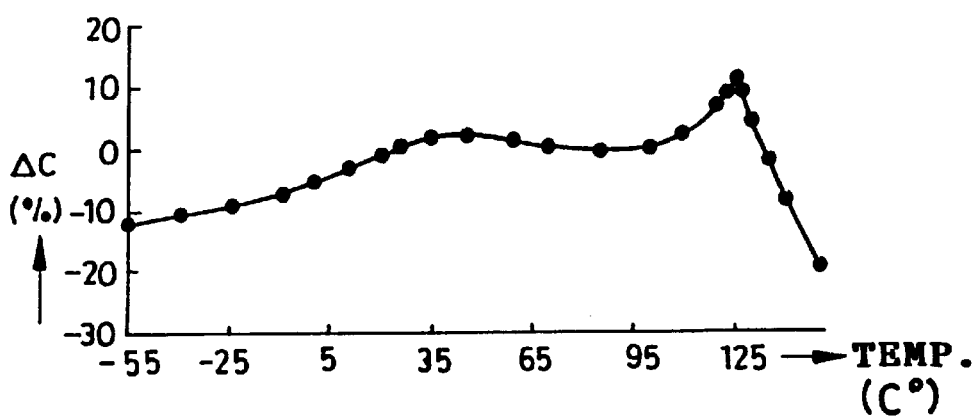
FIG. 6 is a graph showing the temperature characteristic of the capacitance of the FIG. 3 ceramic.
Figure 7:
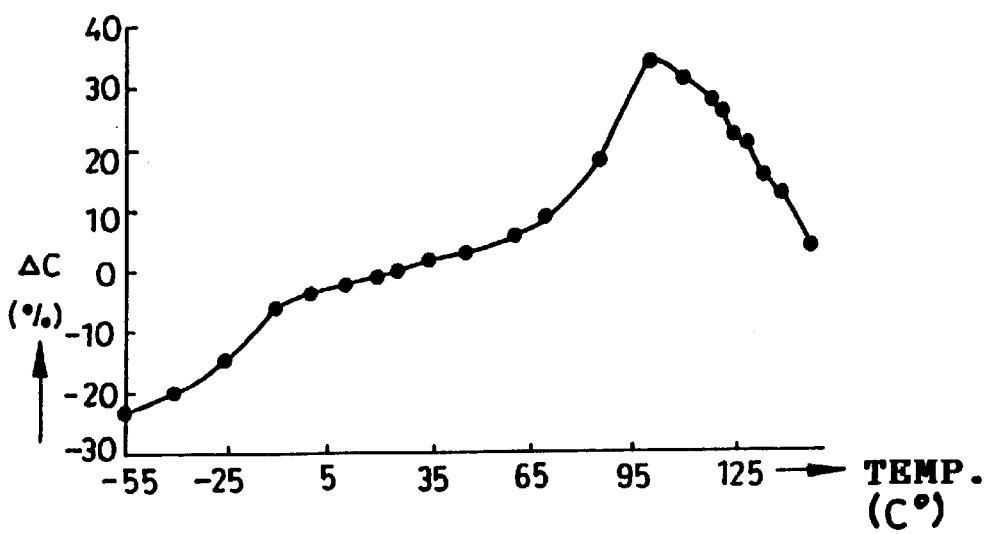
FIG. 7 is a graph showing the temperature characteristic of the capacitance of the FIG. 4 ceramic.

FIGS. 6 and 7 represent the temperature characteristics of capacitances of Samples 2 and 5, respectively. As will be understood from a comparison with FIG. 5, which shows the similar characteristic of Sample 1, the characteristics of Samples 2 and 5 are far less uneven. Particularly objectionable are the peaks at high temperatures.

The firing temperature need not be 1200° C. as in the production of Samples 1–5 but can be anywhere from the sinterable temperature of the particular ceramic material in use to less than a temperature at which Mg diffusion proceeds too fast to permit creation of the desired core-shell configuration. For example, ceramic compositions composed primarily of $BaTiO_3$, such as the one used for Sample 1, are generally not sinterable at 1150° C., and at 1400° C. Mg diffusion is too fast to form the core-shell configuration, so that the firing temperature should be chosen from between these limits.

The firing time is subject to change depending upon the firing temperature. Ceramics similar to those of Sample 5, not meeting the criteria of this invention, will be obtained if the firing time is as long as five hours when the firing temperature is 1250° C. The firing time at that firing temperature should therefore be up to four hours or so.

It should also be taken into account that the relative depths of the paraelectric shells depend not only on the firing temperature and firing time but also on the relative proportions of Ba and Ti in the major component, the proportion of Mg, the proportions of any other additives, the conditions of pretreatment, the firing temperature, and the profile of firing temperatures. The present invention specifies, therefore, that the percentage of the shell depth to the average grain size be from about five to about 30 percent, In conclusion it is not desired that the invention be limited by the exact details of the foregoing disclosure, since a variety of modifications, alterations or adaptations will readily suggest themselves to those skilled in ceramics and allied arts. For example, additional additives such as manganese, vanadium, chromium, cobalt, nickel, iron, niobium, molybdenum, tantalum, and tungsten, as well as oxides and compounds of the listed elements, may be employed. It is also understood that the ceramics according to this invention lend themselves to use not only for capacitors but also for other electronic components and other products. Thus the invention should be construed broadly and in a manner consistent with the fair meaning or proper scope of the appended claims.

What is claimed is:

1. A dielectric ceramic consisting essentially of a major proportion of $ABO_3$, where A is selected from among Ba, Ba+Ca, and Ba+Ca+Sr, where B is selected from among Ti, Ti+Zr, Ti+R, and Ti +Zr+R, R being one or more rare earth metals selected from among Sc, Y, Gd, Dy, Ho, Er, Yb, Tb, Tm, and Lm, and where O is oxygen, and a minor proportion of Mg, the ceramic having a multiplicity of crystal grains each having a paraelectric shell enclosing a ferroelectric core, the shells of the crystal grains having a depth ranging from about five percent to about 30 percent of the average size of the crystal grains.

2. The dielectric ceramic of claim 1 wherein the paraelectric shells of the crystal grains are formed by diffusion of Mg into the grains.

3. The dielectric ceramic of claim 1 further comprising a minor proportion of at least one of $Li_2O$, $SiO_2$, $B_2O_3$, $Cr_2O_3$, and $Al_2O_3$.

* * * * *